(12) United States Patent
John et al.

(10) Patent No.: US 10,437,648 B2
(45) Date of Patent: Oct. 8, 2019

(54) GUIDED LOAD BALANCING OF GRAPH PROCESSING WORKLOADS ON HETEROGENEOUS CLUSTERS

(71) Applicant: Board of Regents, The University of Texas System, Austin, TX (US)

(72) Inventors: Lizy Kurian John, Austin, TX (US); Shuang Song, Austin, TX (US); Andreas Gerstlauer, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 134 days.

(21) Appl. No.: 15/631,848

(22) Filed: Jun. 23, 2017

(65) Prior Publication Data

US 2018/0024869 A1      Jan. 25, 2018

Related U.S. Application Data

(60) Provisional application No. 62/365,554, filed on Jul. 22, 2016.

(51) Int. Cl.
*G06F 9/46* (2006.01)
*G06F 9/50* (2006.01)
(Continued)

(52) U.S. Cl.
CPC .......... *G06F 9/5083* (2013.01); *G06F 9/5005* (2013.01); *G06F 9/5066* (2013.01);
(Continued)

(58) Field of Classification Search
CPC .... G06F 9/5083; G06F 9/5066; G06F 9/5005; G06F 9/46; H04L 41/12; H04L 45/46
See application file for complete search history.

(56) References Cited

U.S. PATENT DOCUMENTS 7,958,120 B2 * 6/2011 Muntz ................... G06Q 10/00
707/736
8,301,391 B2 * 10/2012 Young ..................... G06F 19/12
370/252
(Continued)

OTHER PUBLICATIONS

Khayyat, Zuhair, et al. "Mizan: a system for dynamic load balancing in large-scale graph processing." Proceedings of the 8th ACM European Conference on Computer Systems. ACM. (Year: 2013).*
(Continued)

*Primary Examiner* — Adam Lee
(74) *Attorney, Agent, or Firm* — Robert A. Voigt, Jr.; Winstead, P.C.

(57) ABSTRACT

A method, system and computer program product for load balancing of graph processing workloads. Synthetic proxy graphs are generated to characterize machines' graph processing speeds in a cluster. Each of the graph applications executing in the cluster is profiled using the synthetic graphs to form profiling sets. These formed profiling sets are run among the machines in the cluster to capture the machines' graph processing speeds. A metric for each of the graph applications is computed from a relative speedup among the machines in the cluster and/or the graph processing speeds. A graph file of a natural graph and a graph application are loaded. A metric out of the computed metrics is selected based on the graph application. The natural graph is then partitioned into multiple chunks which is distributed onto two or more machines in the cluster based on the selected metric and a user selected partitioning algorithm.

20 Claims, 8 Drawing Sheets

(51) Int. Cl.
*H04L 12/24* (2006.01)
*H04L 12/715* (2013.01)
*H04L 12/803* (2013.01)

(52) U.S. Cl.
CPC ............... *G06F 9/46* (2013.01); *H04L 41/12* (2013.01); *H04L 45/46* (2013.01); *H04L 47/125* (2013.01); *Y02D 10/22* (2018.01); *Y02D 10/36* (2018.01)

(56) References Cited

U.S. PATENT DOCUMENTS

| | | | | |
|---|---|---|---|---|
| 9,477,532 | B1* | 10/2016 | Hong | G06F 9/4881 |
| 9,594,854 | B1* | 3/2017 | Orofino | G06F 17/50 |
| 9,772,890 | B2* | 9/2017 | Ekanadham | G06F 16/2379 |
| 10,191,948 | B2* | 1/2019 | Vemuri | G06F 16/24554 |
| 10,198,834 | B2* | 2/2019 | Vojnovic | G06T 11/206 |
| 2003/0195931 | A1* | 10/2003 | Dauger | H04L 41/18 709/205 |
| 2008/0195755 | A1* | 8/2008 | Lu | H04L 29/06 709/241 |
| 2011/0258617 | A1* | 10/2011 | Park | G06F 11/3612 717/157 |
| 2012/0259850 | A1* | 10/2012 | Liu | G06F 17/30705 707/737 |
| 2012/0304192 | A1* | 11/2012 | Grove | G06F 9/5083 718/105 |
| 2014/0101219 | A1* | 4/2014 | Tang | G06F 17/142 708/403 |
| 2014/0101668 | A1* | 4/2014 | Gedik | G06F 9/5083 718/105 |
| 2014/0280360 | A1* | 9/2014 | Webber | G06F 17/30958 707/798 |
| 2014/0320497 | A1* | 10/2014 | Vojnovic | G06T 11/206 345/440 |
| 2015/0006316 | A1* | 1/2015 | Zhou | G06Q 10/04 705/26.7 |
| 2015/0095182 | A1* | 4/2015 | Zhou | H04N 21/4668 705/26.7 |
| 2015/0117216 | A1 | 4/2015 | Anand et al. | |
| 2015/0149988 | A1* | 5/2015 | Nakaike | G06F 8/433 717/156 |
| 2016/0063037 | A1* | 3/2016 | Savkli | G06F 16/532 707/722 |
| 2016/0110474 | A1* | 4/2016 | Um | G06F 16/9024 707/722 |
| 2016/0350146 | A1* | 12/2016 | Udupi | G06F 9/45558 |
| 2016/0377442 | A1* | 12/2016 | Ye | G01C 21/3446 701/533 |
| 2017/0017521 | A1* | 1/2017 | Gupta | G06F 9/5011 |
| 2017/0024338 | A1* | 1/2017 | Lavasani | G06F 13/20 |
| 2017/0068746 | A1* | 3/2017 | Levin | G06F 16/278 |
| 2017/0091342 | A1* | 3/2017 | Sun | G06F 16/9024 |
| 2017/0147706 | A1* | 5/2017 | Roth | G06F 16/9024 |
| 2017/0316591 | A1* | 11/2017 | Viswanathan | G06T 11/206 |

OTHER PUBLICATIONS

Shao, Bin, Haixun Wang, and Yatao Li. "Trinity: A distributed graph engine on a memory cloud." Proceedings of the 2013 ACM SIGMOD International Conference on Management of Data. ACM. (Year: 2013).*

Chen et al., "PowerLyra: Differentiated Graph Computation and Partitioning on Skewed Graphs," EuroSys'15, Apr. 21-24, 2015, pp. 1-15.

Tsourakakis et al., "Fennel: Streaming Graph Partitioning for Massive Scale Graphs," Microsoft Research, Technical Report MSR-TR-2012-113, Nov. 2012, pp. 1-16.

LeBeane et al., "Data Partitioning Strategies for Graph Workloads on Heterogeneous Clusters," International Conference for High Performance Computing, Networking, Storage and Analysis, ACM, Article No. 56, Nov. 15-20, 2015, pp. 1-12.

Song et al., "Proxy-Guided Load Balancing of Graph Processing Workloads on Heterogeneous Clusters," 2016 45th International Conference on Parallel Processing (ICPP), Aug. 16-19, 2016, pp. 1-10.

Gonzalez et al., "PowerGraph: Distributed Graph-Parallel Computation on Natural Graphs," 10th USENIX Symposium on Operating Systems Design and Implementation, 2012, pp. 17-30.

Bader et al., "GTgraph: A Synthetic Graph Generator Suite," College of Computing, Georgia Institute of Technology, Feb. 19, 2006, pp. 1-4.

Khayyat et al., "Mizan: A System for Dynamic Load Balancing in Large-Scale Graph Processing," Eurosys, Apr. 15-17, 2013, Prague, Czech Republic, pp. 169-182.

Walker et al., "Large Haptic Topographic Maps: MarsView and the Proxy Graph Algorithm," Proceedings of the 2003 Symposium on Interactive 3D Graphics, Apr. 27-30, 2003, Monterey, California, pp. 83-92.

\* cited by examiner

GUIDED LOAD BALANCING OF GRAPH PROCESSING WORKLOADS ON HETEROGENEOUS CLUSTERS

TECHNICAL FIELD

The present invention relates generally to graph applications, and more particularly to guided load balancing of graph processing workloads on heterogeneous clusters.

BACKGROUND

The amount of digital data stored in the world is considered to be around 4.4 zettabytes now and is expected to reach 44 zettabytes before the year 2020. As data volumes are increasing exponentially, more information is connected to form large graphs that are used in many application domains, such as online retail, social applications, and bioinformatics. Meanwhile, the increasing size and complexity of the graph data brings more challenges for the development and optimization of graph processing systems.

Various big data/cloud platforms are available to satisfy users' needs across a range of fields. To guarantee the quality of different services while lowering maintenance and energy cost, data centers deploy a diverse collection of compute nodes ranging from powerful enterprise servers to networks of off-the-shelf commodity parts. Besides requirements on service quality, cost and energy consumption, data centers are continuously upgrading their hardware in a rotating manner for high service availability. These trends lead to the modern data centers being populated with heterogeneous computing resources. For instance, low-cost ARM®-based servers are increasingly added to existing x86-based server farms to leverage the low energy consumption.

Despite these trends, most cloud computing and graph processing frameworks, like Hadoop®, and PowerGraph, are designed under the assumption that all computing units in the cluster are homogeneous. Since "large" and "tiny" machines coexist in heterogeneous clusters, uniform graph/data partitioning leads to imbalanced loads for the cluster. When given the same amount of data and application, the "tiny" machines in the cluster can severely slow down the overall performance whenever dependencies or the need of synchronization exists. Such performance degradation has been previously observed. Heterogeneity-aware task scheduling and both dynamic and static load balancing have been proposed to alleviate this performance degradation. Dynamic load balancing is designed to avoid the negative impact of insufficient graph/data partitioning information in the initial stage, where heterogeneity-aware task scheduling can be applied non-invasively on top of load balancing schemes.

Ideally, an optimal load balancing/graph partitioning should correctly distribute the graph data according to each machine's computational capability in the cluster, such that heterogeneous machines can reach the synchronization barrier at the same time. State-of-the-art online graph partitioning work estimates the graph processing speed of different machines solely based on hardware configurations (number of hardware computing slots/threads). However, such estimates cannot capture a machine's graph processing capability correctly. Different applications and machines scale differently with increasing computational ability. Furthermore, there exists a diversity of graph applications.

In order to capture the computing capabilities of heterogeneous machines accurately, profiling is often the most effective methodology. However, computation demands also depend on applications and input graphs. It is difficult to subsample from a natural graph to capture its underlying characteristics, as vertices and edges are not evenly distributed in it. Again, this may lead to inaccurate modeling of machines' graph processing capability.

Hence, there is currently not a means for accurately modeling the machines' graph processing capability in heterogeneous clusters, and, as a result, there is currently not a means for optimally load balancing/graph partitioning so as to appropriately distribute the graph data according to each machine's computational capability in the cluster.

SUMMARY

In one embodiment of the present invention, a method for load balancing of graph processing workloads comprises generating synthetic proxy graphs to characterize machines' graph processing speeds in a cluster. The method further comprises profiling each of a plurality of graph applications executing in the cluster using the synthetic graphs to form profiling sets. The method additionally comprises running the formed profiling sets among machines in the cluster to capture the machines' graph processing speeds. Furthermore, the method comprises computing a relative speedup among the machines in the cluster. Additionally, the method comprises computing a metric for each of the graph applications from the relative speedup and/or the graph processing speeds, where the metric represents the application-specific relations between the graph processing speeds of the machines in the cluster. In addition, the method comprises loading a graph file of a natural graph and a first graph application. The method further comprises selecting a metric out of the computed metrics based on the first graph application. The method additionally comprises partitioning, by a processor, the natural graph into multiple chunks and distributing the chunks onto two or more of the machines in the cluster based on the selected metric and a user selected partitioning algorithm.

Other forms of the embodiment of the method described above are in a system and in a computer program product.

In another embodiment of the present invention, a method for selecting which machines in a cluster to perform a job comprises generating synthetic proxy graphs to characterize machines' graph processing speeds in a cluster. The method further comprises generating information by profiling the generated proxy graphs. The method additionally comprises selecting, by a processor, two or more machines in the cluster to perform the job using the information.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention guides load balancing/graph partitioning for multi-node clusters. With the present invention, the load balancing of graph processing workloads is achieved, which results in significant performance and energy consumption improvements.

Figure 1:
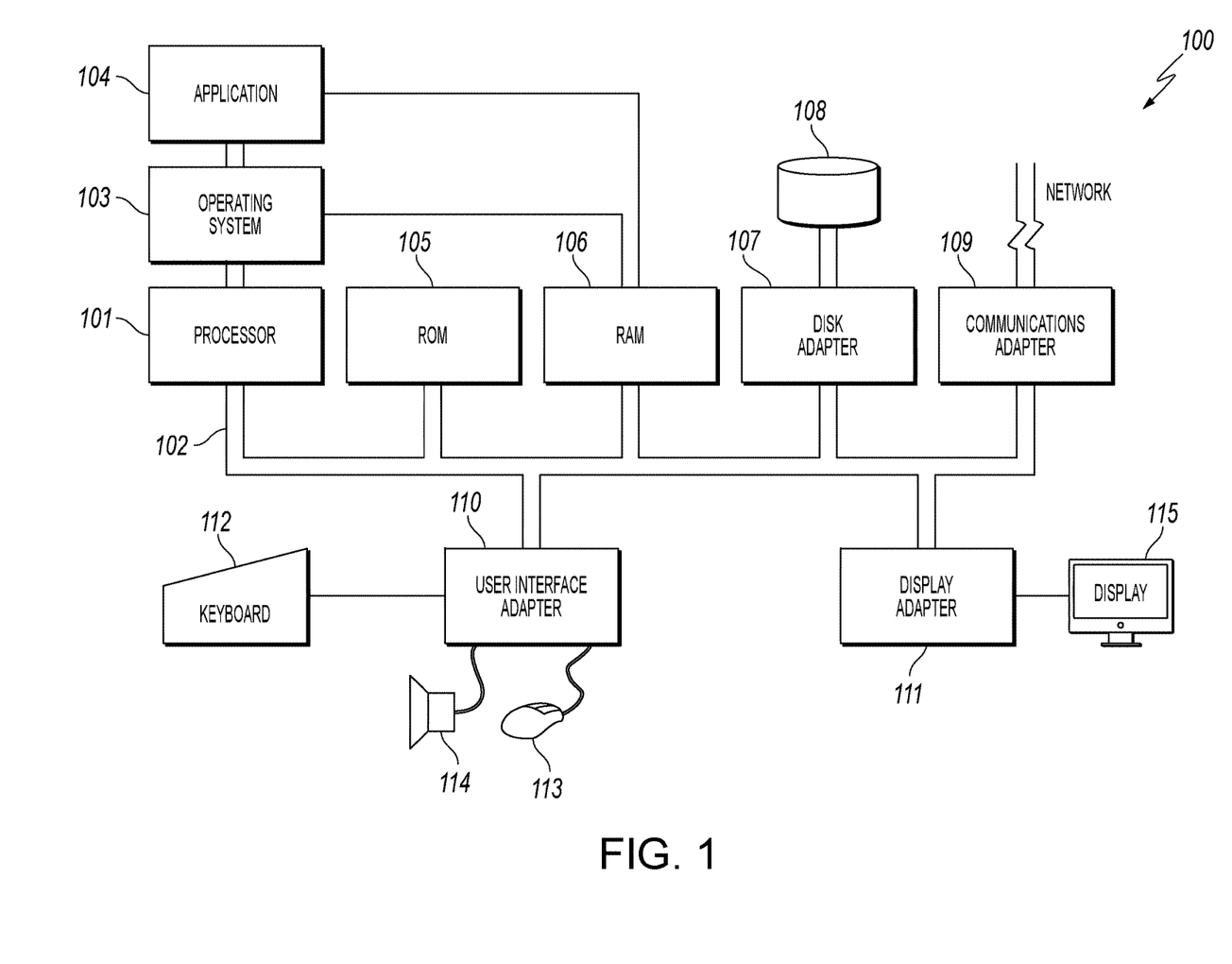
FIG. 1 illustrates a hardware configuration of a computing system which is representative of a hardware environment for practicing the present invention.

Referring now to the Figures in detail, FIG. 1 illustrates a hardware configuration of a computing system 100 which is representative of a hardware environment for practicing the present invention. Computing system 100 may be any type of computing device (e.g., portable computing unit, Personal Digital Assistant (PDA), smartphone, tablet computer, laptop computer, mobile phone, navigation device, game console, desktop computer system, workstation, Internet appliance and the like) configured with the capability of providing guided load balancing of graph processing workloads on heterogeneous clusters.

Referring to FIG. 1, computing system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, an application for load balancing of graph processing workloads as discussed below in association with FIGS. 2-5, 6A-6B and 7-9.

Referring again to FIG. 1, read-only memory ("ROM") 105 may be coupled to system bus 102 and include a basic input/output system ("BIOS") that controls certain basic functions of computing system 100. Random access memory ("RAM") 106 and disk adapter 107 may also be coupled to system bus 102. It should be noted that software components including operating system 103 and application 104 may be loaded into RAM 106, which may be computing system's 100 main memory for execution. Disk adapter 107 may be an integrated drive electronics ("IDE") adapter that communicates with a disk unit 108, e.g., disk drive. It is noted that the program for load balancing of graph processing workloads, as discussed below in association with FIGS. 2-5, 6A-6B and 7-9, may reside in disk unit 108 or in application 104.

Computing system 100 may further include a communications adapter 109 coupled to bus 102. Communications adapter 109 may interconnect bus 102 with an outside network thereby allowing computing system 100 to communicate with other devices.

I/O devices may also be connected to computing system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing system 100 through keyboard 112 or mouse 113 and receiving output from computing system 100 via display 115 or speaker 114. Other input mechanisms may be used to input data to computing system 100 that are not shown in FIG. 1, such as display 115 having touch-screen capability and keyboard 112 being a virtual keyboard. Computing system 100 of FIG. 1 is not to be limited in scope to the elements depicted in FIG. 1 and may include fewer or additional elements than depicted in FIG. 1. For example, while FIG. 1 illustrates computing system 100 with a single processor, computing system 100 may include multiple processors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there is currently not a means for accurately modeling the machines' graph processing capability in heterogeneous clusters, and, as a result, there is currently not a means for optimally load balancing/graph partitioning so as to appropriately distribute the graph data according to each machine's computational capability in the cluster.

The principles of the present invention provide a means for accurately modeling the machines' graph processing capability in heterogeneous clusters. In one embodiment, the present invention uses synthetic power-law proxy graphs' profiling to guide the graph partitioning for heterogeneous clusters. In one embodiment, the synthetic graphs following power-law distributions can be used as proxy graphs to measure a machine's graph processing capability in heterogeneous data centers. A "Computation Capability Ratio (CCR)" metric is defined to represent the computing units' diverse and application-specific processing speeds in a heterogeneous cluster. Compared to the current state-of-the-art techniques, the present invention reduces the heterogeneity estimation error from 108% to 8% with negligible overhead, as the present invention only needs to generate synthetic graphs once to cover real world graphs with a wide distribution range. Furthermore, profiling only needs to be done once for each reusable application in the heterogeneous cluster.

Furthermore, besides runtime and energy improvements, the present invention exhibits advantages in measuring a machine's cost efficiency within commercial cloud computing platforms. It is difficult to select the right machines that provide high performance with reasonable cost simply by reading their hardware configuration information. Synthetic graph profiling can help to quantify the cost efficiency of formed clusters, or select the nodes with better cost efficiency for graph related work.

A discussion regarding the heterogeneity-aware CCR metric and its incorporation into the heterogeneity-aware graph partitioning algorithms is now deemed appropriate.

CCR is used to characterize the cluster's heterogeneity. It represents the application-specific relations between graph processing speeds of different types of machines in the cluster. Formally, for a given application i and machine j, $CCR_{i,j}$ is defined as follow:

$$CCR_{i,j} = \frac{\max(t_{i,j}) \forall j}{t_{i,j}}, \quad (1)$$

where $\max(t_{i,j})$ denotes the execution time of the slowest machine in the cluster. Several factors can affect CCR, such as the heterogeneity of the cluster, the degree distribution of synthetic graphs, and the graph applications themselves. Graph size is a trivial factor, since it only affects the magnitude of execution time while not reflecting the relative speedups in a heterogeneous cluster. A cluster's heterogeneity is the main component impacting CCR, as it is the variation on computing resources that determines the graph processing speeds and maximum parallelisms for graph applications. The degree distribution also impacts the CCR in the way that denser graphs require more computation power and hence result in more speedup on fast machines. The profiling process of the present invention can completely cover these three important factors and generate accurate CCRs to guide the heterogeneity-aware graph partitioning algorithms and thus achieve load balancing.

Figure 2:
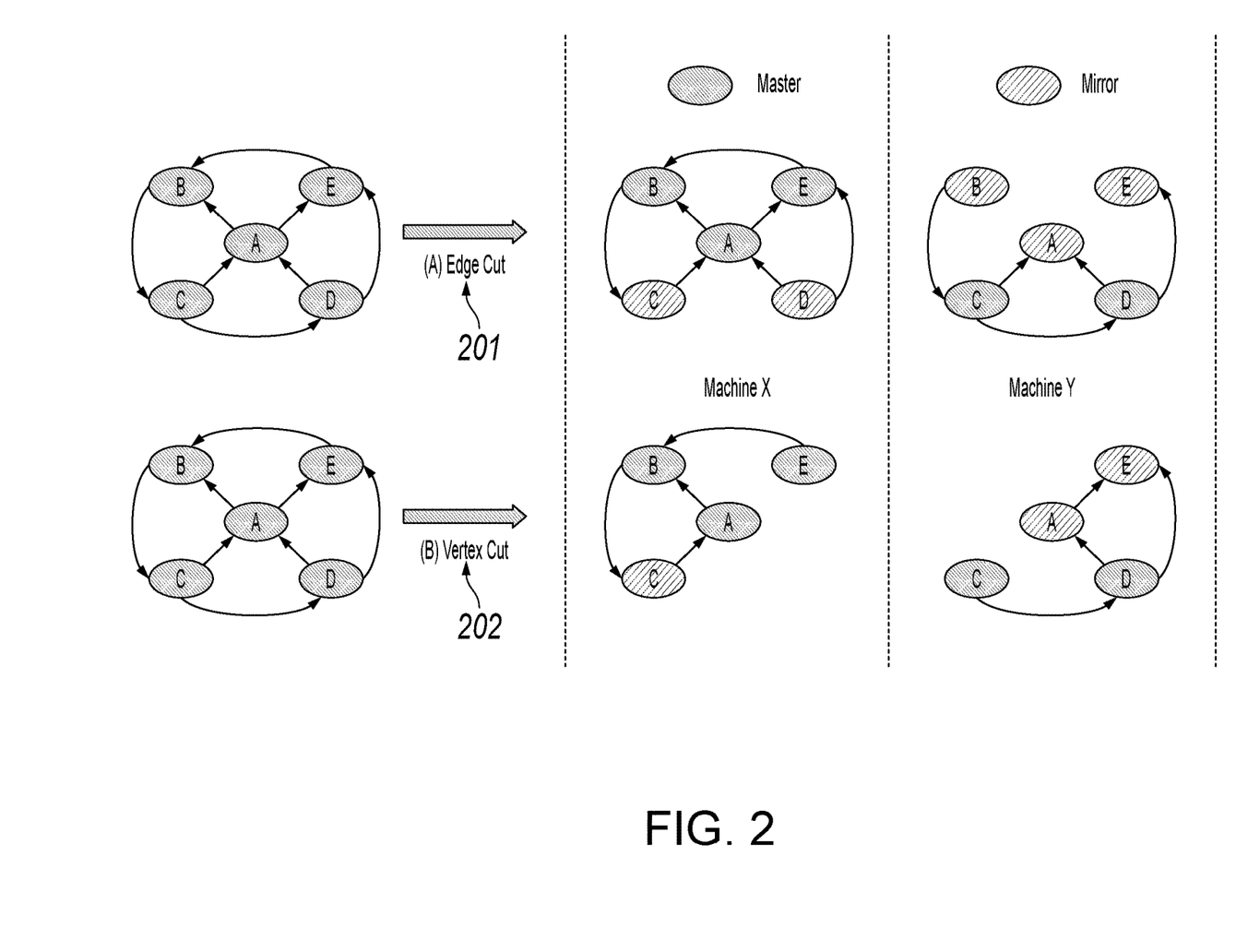
FIG. 2 illustrates edge cuts versus vertex cuts in accordance with an embodiment of the present invention.

Graph partitioning algorithms can choose either edge cuts or vertex cuts as shown in FIG. 2. FIG. 2 illustrates edge cuts 201 versus vertex cuts 202 in accordance with an embodiment of the present invention. Vertex cuts 202 split the vertices by assigning edges to different machines. Graphs with non-negligible amount of high-degree vertices prefer the vertex cut methods, as this can reduce the amount of replications of graph segments (defined as mirrors). Random Hash, Oblivious, and Grid are three partitioning algorithms using vertex cuts only.

In one embodiment, heterogeneity-aware algorithms proposed in LeBeane et al., "Data Partitioning Strategies for Graph Workloads on Heterogeneous Clusters," International Conference for High Performance Computing, Networking, Storage and Analysis, ACM, Article Number 56, Nov. 15-20, 2015, pp. 1-12, which is incorporated by reference herein in its entirety, are extended by employing a CCR-based partitioning.

Figure 3:
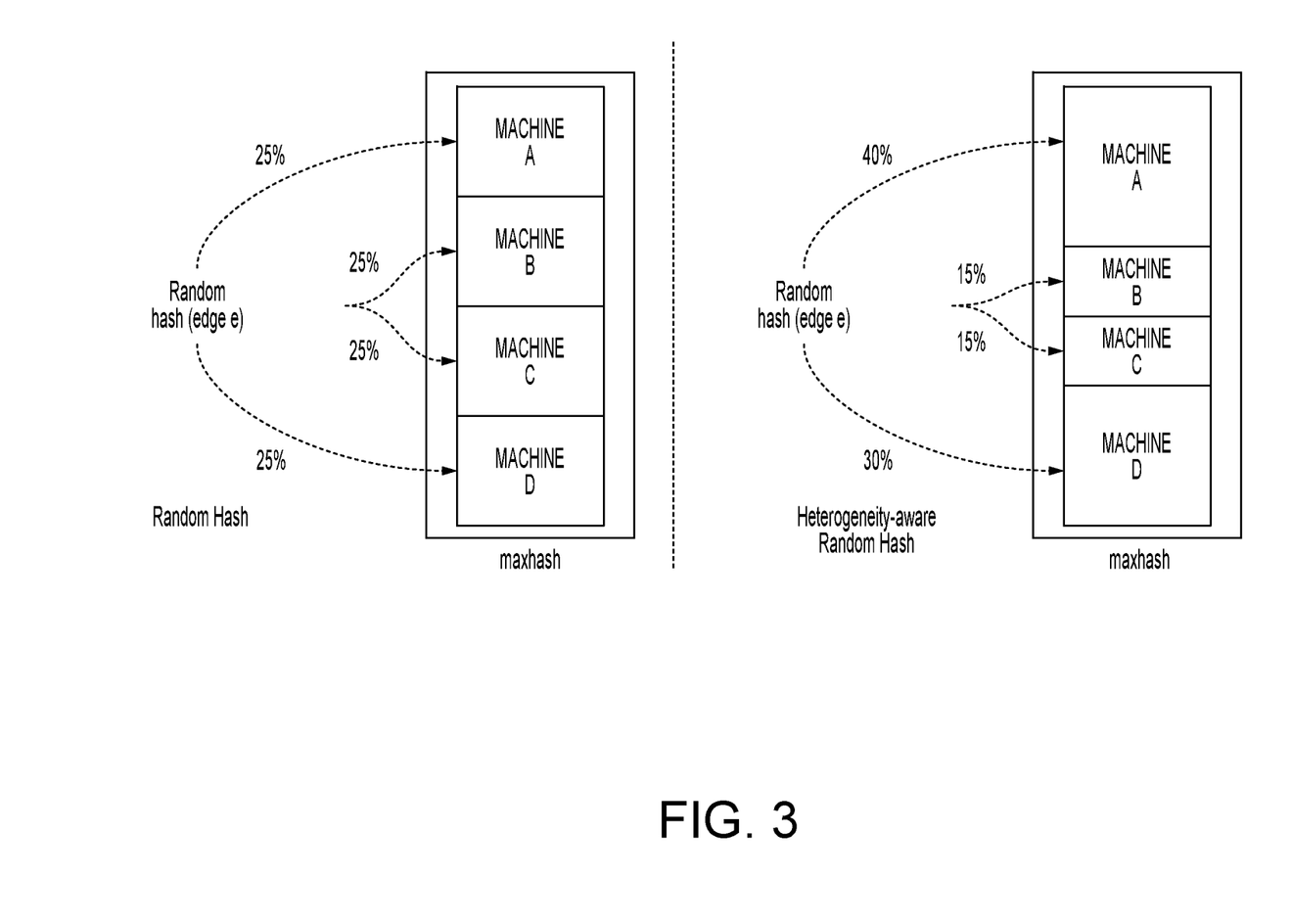
FIG. 3 illustrates the difference between Random Hash and heterogeneity-aware Random Hash in accordance with an embodiment of the present invention.
Figure 4:
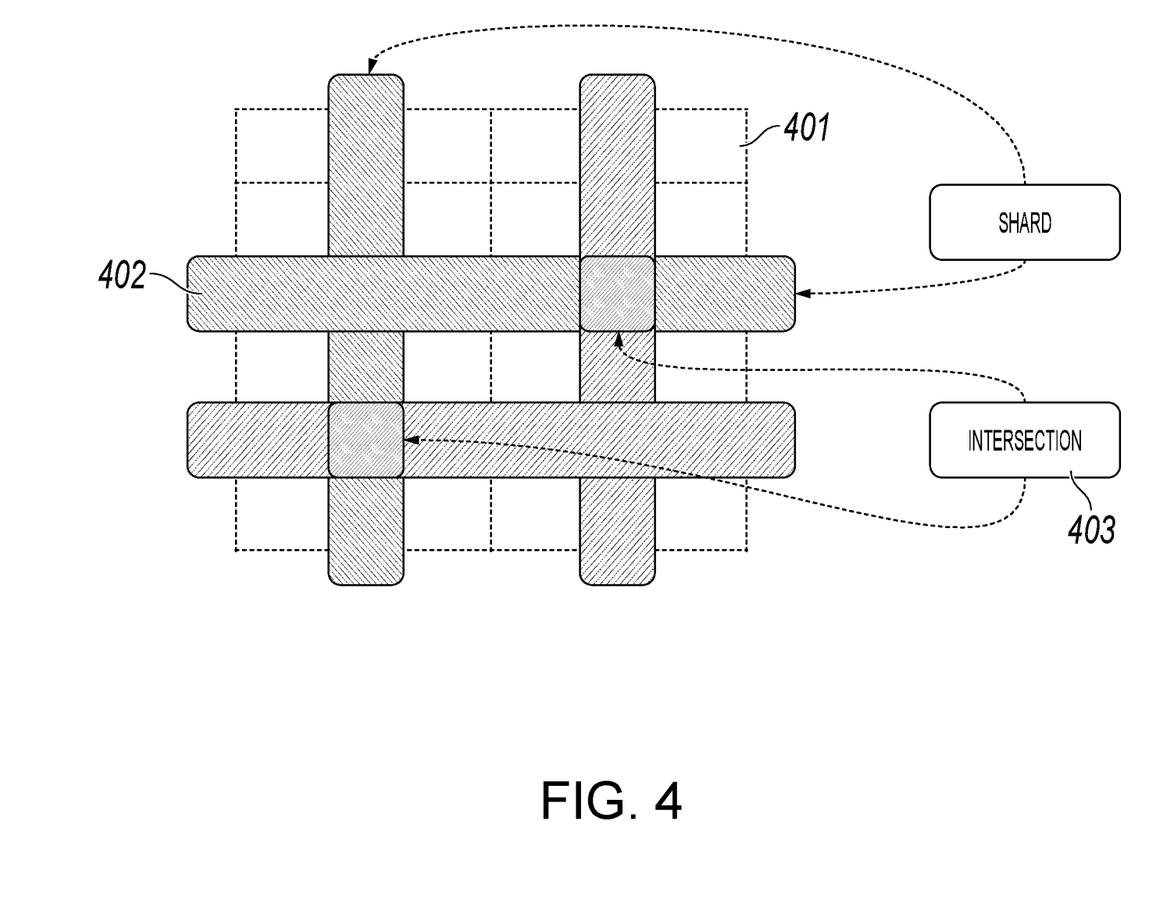
FIG. 4 illustrates the machine grid and shards in accordance with an embodiment of the present invention.

Concerning the heterogeneity-aware Random Hash, to assign an edge, a random hash of edge e is computed and used as the index of the machine to assign the edge to. As shown in FIG. 3, which illustrates the difference between Random Hash and heterogeneity-aware Random Hash in accordance with an embodiment of the present invention, each machine has the same probability of receiving an incoming edge. In order to embed heterogeneity information, the algorithm is extended to weigh machines differently, such that the probability of generating indexes for each machine strictly follows the CCR.

Concerning the heterogeneity-aware Oblivious, the Oblivious is a partitioning algorithm using vertex cuts. The Oblivious partitioning algorithm is designed to enhance data locality by partitioning based on the history of edge assignments. The Original Oblivious algorithm is based on several heuristics that aim to assign an edge accounting for the load situation and the assignment of source and target vertices. To enable heterogeneity-aware partitioning, the present invention assigns machines different weights based on the CCR. Besides considering the load situation, this allows weights of different machines to be incorporated to guide the assignment of each edge. It is noted that the heuristics combined with CCR-guided weight assignment do not guarantee an exact balance in accordance with CCR.

Concerning the heterogeneity-aware Grid, the Grid method is designed to limit the communication overheads by constraining the number of candidate machines for each assignment. The number of machines in the cluster has to be a square number, as they are used to form a square matrix grid as displayed in FIG. 4, which illustrates the machine grid 401 and shards 402 in accordance with an embodiment of the present invention. A shard 402 is defined as a row or column of machines in this context. Similar to the concept of heterogeneous Random Hash, each shard 402 has its weight, which is determined from the weights of the machines in the shard 402. Differently, every vertex is hashed to a shard 402 instead of a single machine. For each edge, two selected shards 402 corresponding to the source and target vertices generate an intersection 403. Considering the current edge distribution and the edge placements suggested by CCR, each machine in intersection 403 receives a score. The edge will be allocated to the machine with the maximum score.

Compared to vertex cuts 202, edge cuts 201 shown in FIG. 2 can significantly reduce mirrors for graphs with huge amount of low-degree vertices and few high-degree vertices. Different from all three algorithms previously discussed, mixed cut algorithms, including Hybrid and Ginger partitioning schemes proposed in Shi et al., "PowerLyra: Differentiated Graph Computation and Partitioning on Skewed Graphs," in EuroSys'15, Apr. 21-24, 2015, pp. 1-15, which is incorporated by reference herein in its entirety, take advantage of both vertex and edge cuts.

Concerning heterogeneity-aware Hybrid and Ginger, the Hybrid and Ginger use two-phase methods to accomplish the partitioning. In the first phase, edge cuts are used to partition the graph. All edges are assigned to nodes based on the random hashes of target vertices. After the first pass, all in-degree edges of vertices with a small amount of edges are grouped with target vertices and no mirrors would be created. As the entire graph has been scanned through in the first phase, the total number of edges of each vertex can be easily obtained. In the second phase, all vertices with a large amount of in-degree edges (higher than a certain threshold) are randomly re-assigned by hashing their source vertices. For high-degree vertices, the number of mirrors is constrained by the number of partitions rather than the degree of vertices.

Ginger is a heuristic version of Hybrid, which was proposed by Tsourakakis et al., "Fennel: Streaming Graph Partitioning for Massive Scale Graphs," Microsoft Research, Technical Report MSR-TR-2012-113, November 2012, pp. 1-16, which is incorporated by reference herein in its entirety. For high-degree vertices, it operates the same as Hybrid. For low-degree vertices, Ginger uses reassignment to achieve minimal replication in the second round. The reassignment of vertex v must satisfy equation 2 below.

$$\text{score}(v,i) > \text{score}(v,j) \forall j \in \text{cluster}, \quad (2)$$

where score $[v,i] = |N(v) \cap V\rho| - \gamma^* b(\rho)$ is the score function. $V\rho$ denotes v in machine $\rho$ and $N(v)$ represents the number of neighboring vertices of v. $b(\rho)$ is a balance function to express the cost of assigning v to machine $\rho$, which considers both vertices and edges located on machine $\rho$.

The way of modifying the first pass and second pass (for high-degree vertices only) to be heterogeneity-aware is exactly the same as in the Random Hash method previously described. A heterogeneity factor $1-CCR\rho$ is incorporated into the score calculation formula such that a fast machine has a smaller factor to gain a better score. The function score:max( ) returns the machine ID with the maximum score in the list.

As discussed above, the algorithm that is used to generate synthetic proxy graphs follows power-law distributions. In one embodiment, a numerical procedure is used to compute the parameter a in the power-law distribution for real graphs. As discussed below, the parameter can be used to tune the distribution/density of synthetic graphs to form samples with better coverage.

It has been observed that most natural graphs follow power-law distributions. As a result, the present invention generates synthetic power-law proxy graphs to characterize a machine's graph processing speed. A power-law distribution is a functional relationship between two objects in statistics, where one object varies as a power of another. A graph is defined to follow the power-law distribution if the distribution of the degree d of a vertex follows:

$$P(d) \propto d^{-\alpha}, \tag{3}$$

where the exponent $\alpha$ is the positive constant that controls the degree distribution. For instance, a high degree d leads to smaller probability P(d), which results in a fewer amount of vertices with high degrees in the graph. Similarly, small values of the exponent $\alpha$ induce high graph density, where a small number of vertices have extremely high degrees.

In one embodiment, the present invention implements a graph generator that can quickly produce graphs following power-law distributions. Since the performance of most graph applications is highly dependent on input graph distribution and sparsity, generated synthetic proxy graphs and real graphs need to follow similar distributions to achieve accurate profiling. However, it is difficult to use real graphs for profiling and CCR generation, as it is too expensive to profile the cluster once receiving a new graph. Furthermore, it is difficult to form a comprehensive sample graph set by randomly selecting natural graphs. However, these difficulties can easily be avoided by synthetic graphs. It is noted that having similar distributions does not guarantee the capability to predict real execution time. However, it is sufficient to detect heterogeneous machines' graph processing capabilities.

In one embodiment, the synthetic graph generator of the present invention is illustrated in Algorithm 1 shown below.

```
1:   procedure GRAPH GENERATION
2:      for i _ N do
3:         pd f [i] = i^-α
4:      end for
5:      cd f = transform(pd f)
6:      hash = constant value
7:      for u ≤ N do
8:         degree = multinomial(cd f)
9:         for d ≤ degree do
10:           v = (u+hash)modN
11:           output_edge(u, v)
12:        end for
13:     end for
14:  end procedure
```

It takes the number of vertices N and $\alpha$ parameter as inputs. Based on distribution factor $\alpha$, the probability of each vertex is calculated and associated with the number of degrees that will be generated later. Then, the probability density function (pd fi (corresponding to a probability of each vertex based on the distribution factor $\alpha$) will be transformed into a cumulative density function (cd f). The total number of degrees of any vertex is generated by the cdf function. All the connected vertices are produced by a random hash. If directional edges are needed, the order of edge (u, v) could be understood as the graph having an edge from u to v and vice-versa. To omit self-loops, a condition check on vertex u being unequal to vertex v is added in the process, if necessary. The overhead of generating synthetic graphs depends on the graph size and distribution.

In order to artificially generate power-law graphs for performance sampling, the parameter a that determines the sparsity level of the underlying graphs is important. To precisely generate representative synthetic proxy graphs, the distribution diversity of real graphs needs to be explored. A numerical procedure for computing the tunable parameter a of an existing natural graph with only the number of vertices and edges given is now described. From the power-law distribution in Equation 3, it is noted that a characterization of the power-law distribution does not explicitly show the normalization constant. For the purpose of estimating a, it is convenient to work with the following characterization $$P(d) = \frac{d^{-\alpha}}{\sum_{i=1}^{i=D} i^{-\alpha}}, \tag{4}$$

where D denotes the total number of degrees. The first moment of the discrete random variable d is computed as follows, $$E[d] = \sum_{d=1}^{d=D} dP(d) = \sum_{d=1}^{d=D} \frac{d^{-\alpha+1}}{\sum_{i=1}^{i=D} i^{-\alpha}}. \tag{5}$$

Let $\mathscr{E}$ and $\mathscr{V}$ denote the sets of edges and vertices in a graph, respectively. The average degree of a graph E[d] can be approximated empirically as follows, $$E[d] = \frac{|\mathscr{E}|}{|\mathscr{V}|}, \tag{6}$$

where $\mathscr{X}$ denotes the cardinality of the set X. Since the total number of edges and vertices of the input graph is given, a is computed by equating (5) with (6). Thus, a can be expressed as the root of the following function, $$F(\alpha) = \sum_{d=1}^{d=D} \frac{d^{-\alpha+1}}{\sum_{i=1}^{i=D} i^{-\alpha}} - \frac{|\mathscr{E}|}{|\mathscr{V}|} = 0. \tag{7}$$

The standard Newton method can then be applied for solving the root of the equation $F(\alpha)=0$. Once $\alpha$ is computed, it can be inputted into the synthetic graph generator. Normally, generating several synthetic proxy graphs with different a is a one-time procedure, which covers a wide range of real graphs, as most natural graphs follow power-law distribution with parameters varying only within a limited range (e.g., from 1.9 to 2.4). However, in order to verify the coverage of generated synthetic graphs, the $\alpha$ of each natural input graph can be calculated. If its a is beyond the covered range, an additional synthetic graph can be generated and added to the current set. The $\alpha$ computing process of the present invention is extremely quick (less than 1 ms), and the overhead is negligible.

Figure 5:
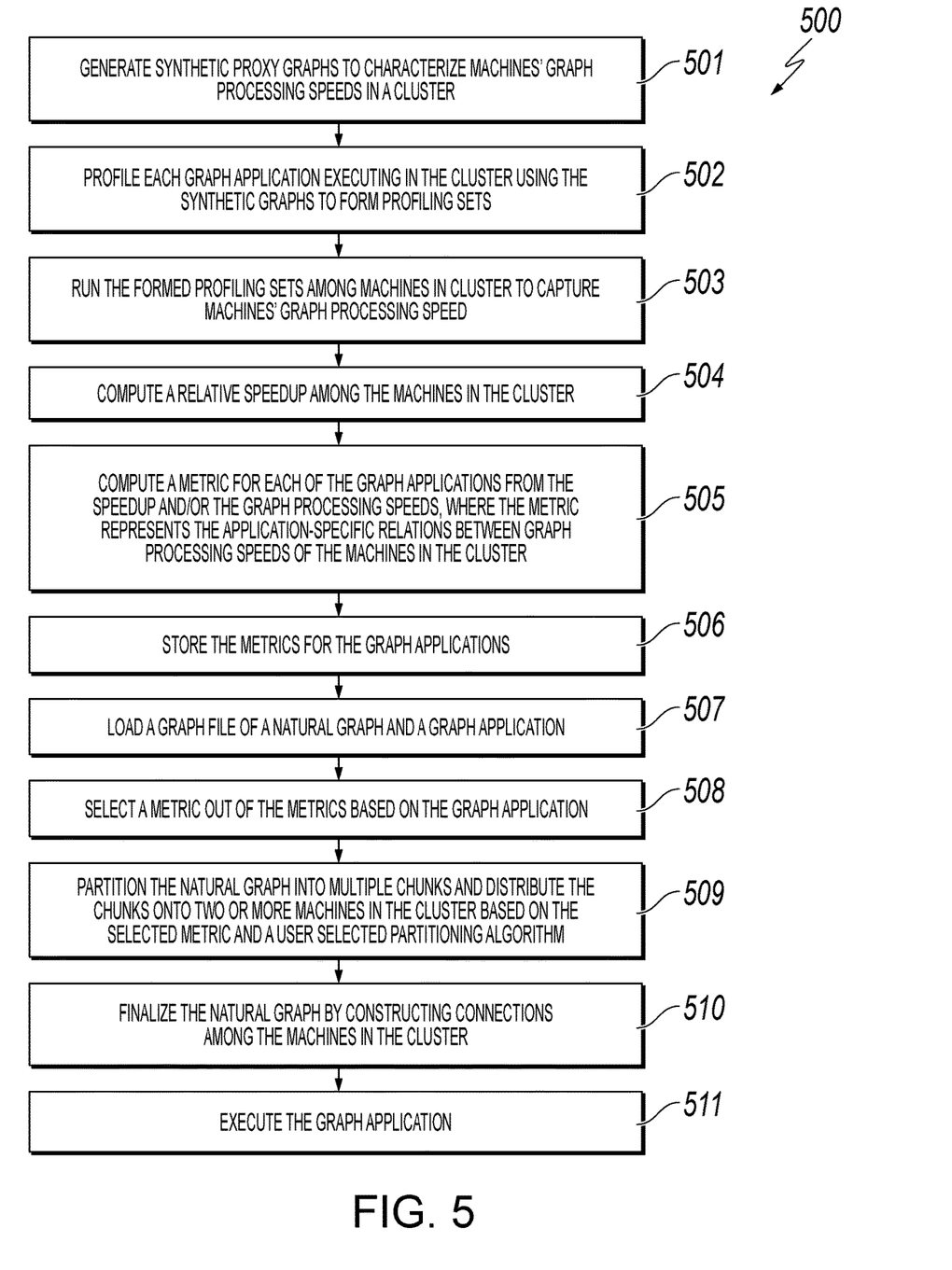
FIG. 5 is a flowchart of a method for load balancing of graph processing workloads in accordance with an embodiment of the present invention.
Figure 6A:
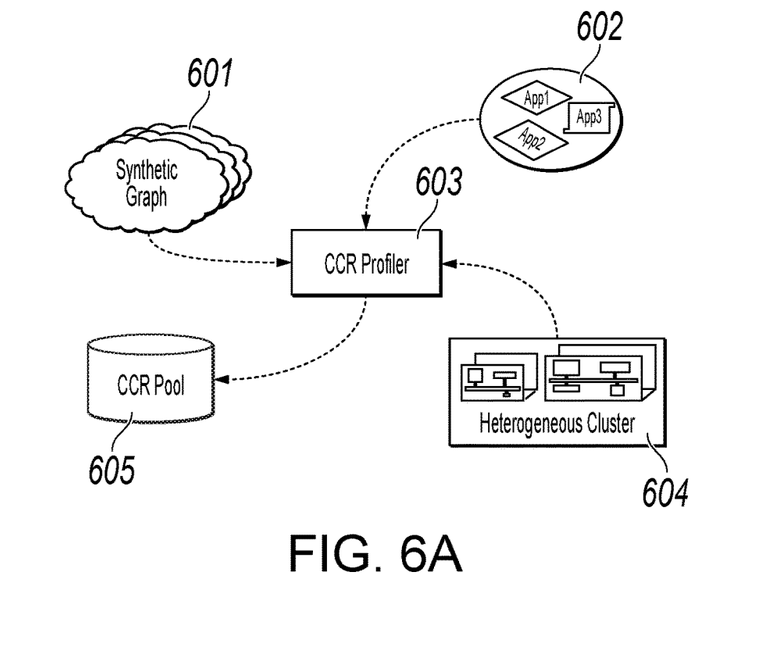
FIG. 6A illustrates the profiling for Computation Capability Ratio (CCR) generation in accordance with an embodiment of the present invention.
Figure 6B:
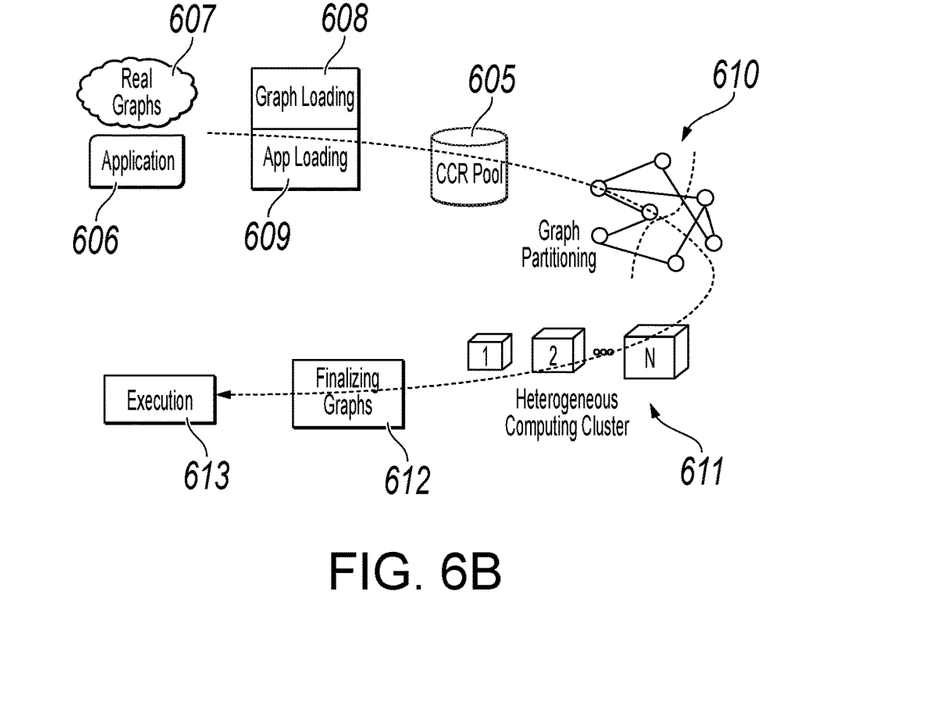
FIG. 6B illustrates the flow of the modified PowerGraph framework in accordance with an embodiment of the present invention.

The present invention provides guided load balancing of graph processing workloads on heterogeneous clusters as discussed below in connection with FIGS. 5 and 6A-6B. FIG. 5 is a flowchart of a method for load balancing of graph processing workloads. FIG. 6A illustrates the profiling for CCR generation. FIG. 6B illustrates the flow of the modified PowerGraph framework using the principles of the present invention.

As stated above, FIG. 5 is a flowchart of a 500 method for load balancing of graph processing workloads in accordance with an embodiment of the present invention.

Referring to FIG. 5, in conjunction with FIGS. 1-4, in step 501, computing system 100 generates synthetic proxy graphs to characterize the machines' graph processing speeds in a cluster as discussed above.

In step 502, computing system 100 profiles each graph application executing in the cluster using the synthetic graphs to form profiling sets.

The main idea of graph partitioning in heterogeneous environments is to distribute input graphs onto different machines proportional to their CCRs. To accurately generate CCRs, all the impacting factors need to be covered, such as the heterogeneous machines, graph applications, and the distributions of the graphs. To do so, profile graph applications executing in the heterogeneous cluster using synthetic graphs with diverse distributions need to be profiled. Referring now to FIG. 6A, which illustrates the profiling for CCR generation in accordance with an embodiment of the present invention, the generated synthetic graphs 601 are taken as inputs and combined with each graph application 602 to form independent profiling sets 603. It is necessary to profile each application because graph applications are naturally diverse. This implies that a single profiling set is not enough to cover all application characteristics. Moreover, the application-specific profiling methodology of the present invention provides more flexibility, as any special-purpose application can be sampled and fit into the flow.

Returning to FIG. 5, in conjunction with FIGS. 1-4 and 6A, in step 503, computing system 100 runs the formed profiling sets among machines in the cluster to capture the machines' graph processing speed. A method for running the formed profiling sets among the machines in the cluster to capture the machines' graph processing speed is discussed below in connection with FIG. 7.

Figure 7:
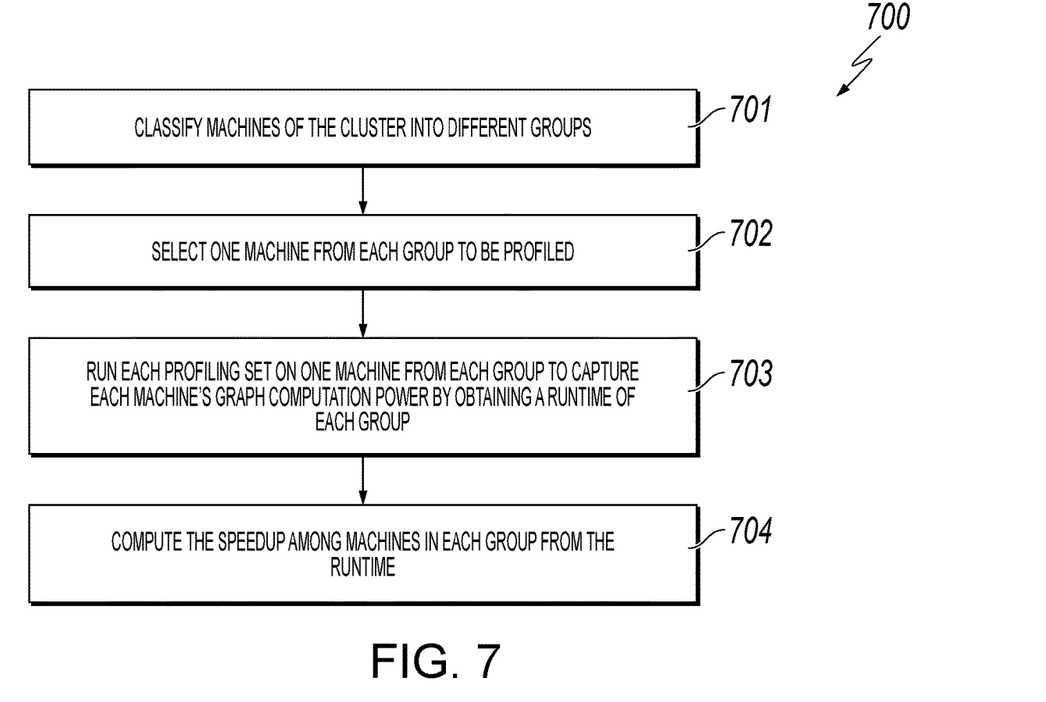
FIG. 7 is a flowchart of a method for running the formed profiling sets among the machines in the cluster to capture the machines' graph processing speed in accordance with an embodiment of the present invention.

FIG. 7 is a flowchart of a method 700 for running the formed profiling sets among the machines in the cluster to capture the machines' graph processing speed in accordance with an embodiment of the present invention.

Referring to FIG. 7, in conjunction with FIGS. 1-5 and 6A, in step 701, computing system 100 classifies the machines of the cluster into different groups.

In step 702, computing system 100 selects one machine from each group to be profiled, such as in a data storage unit (e.g., memory 105, disk unit 108).

In step 703, each profiling set is run on one machine from each group in the cluster to capture each machine's graph computation power by obtaining a runtime of each group.

In step 704, computing system 100 computes the speedup among the machines in each group from the runtime.

For example, in one embodiment, for a given heterogeneous cluster 604 (see FIG. 6A), the machines are classified into different groups and only one machine is selected from each group in order to minimize the profiling overhead. For instance, if the heterogeneous cluster 604 is formed by Amazon EC2 virtual nodes, all C4.xlarge machines within the deployed cluster should be treated as one group, but only one of them needs to be profiled. After grouping, each profiling set is executed on one machine from each group in parallel. The purpose of running profiling sets on machines individually is that each machine's graph computation power can be captured without communication interference.

Returning to FIG. 5, in conjunction with FIGS. 1-4 and 6A, in step 504, computing system 100 computes a relative speedup among the machines in the cluster. In one embodiment, after the parallel profiling process, the runtime of each machine group can be obtained. This runtime information is used to compute the speedup among machines. The CCR for the application is created from this speedup data. For example, if machine A runs profiling set X two times faster than the baseline machine B, the CCR for these two machines on profiling set X is 2:1. After the profiling process finishes, each application's CCR will be collected into a CCR pool 605 for future use. In one embodiment, CCR profiling is a one-time offline process. CCR pool 605 needs to be updated whenever computing resources in heterogeneous cluster 604 change. However, re-profiling is only required if new machines types are deployed or machine characteristics otherwise change. Varying the cluster composition among existing machines does not require CCR updates. Given its low overhead, dynamic changes in resources can be captured by running the profiler and updating CCR pool 605 online at regular intervals.

In step 505, computing system 100 computes a metric for each of the graph applications from the speedup and/or the graph processing speeds, where the metric represents the application-specific relations between graph processing speeds of the machines in the cluster (e.g., the application-specific relations between graph processing speeds of different types of machines in a heterogeneous cluster).

In step 506, computing system 100 stores the metrics for the graph application.

In step 507, computing system 100 loads a graph file of a natural graph and a graph application.

In step 508, computing system 100 selects a metric out of the metrics based on the graph application.

In step 509, computing system 100 partitions the natural graph into multiple chunks and distribute the chunks onto two or more machines in the cluster based on the selected metric and a user selected partitioning algorithm.

In step 510, computing system 100 finalizes the natural graph by constructing connections among the machines in the cluster.

In step 511, computing system 100 executes the graph application.

For example, in one embodiment, the methodology of the present invention was evaluated using the PowerGraph framework. Since the profiling work is done completely offline, the scheme of the present invention is independent of the underlying setup and can be equally applied to other distributed graph processing frameworks. FIG. 6B illustrates the flow of the modified PowerGraph framework in accordance with an embodiment of the present invention. Referring to FIG. 6B, generally, graph processing inputs are the application 606, the graph 607 (real graphs), and other graph-related information, such as number of edges/vertices and the format. The framework first loads input graph files 608 and the application 609. Then, based on the application, one corresponding CCR set would be picked from pool 605, which is pre-generated by the offline profiling process previously described. Based on the application specific CCR and user selected partitioning algorithm (heterogeneity-aware partitioning algorithms previously described), the graph partitioner splits the graph into multiple chunks 610 and distributes them onto nodes 611 in the cluster accordingly. After the partitioning phase, the framework needs to finalize the graph 612 by constructing the connections among machines, to achieve point-to-point communication and synchronization during execution. The last step of the flow is the application execution 613.

Figure 8:
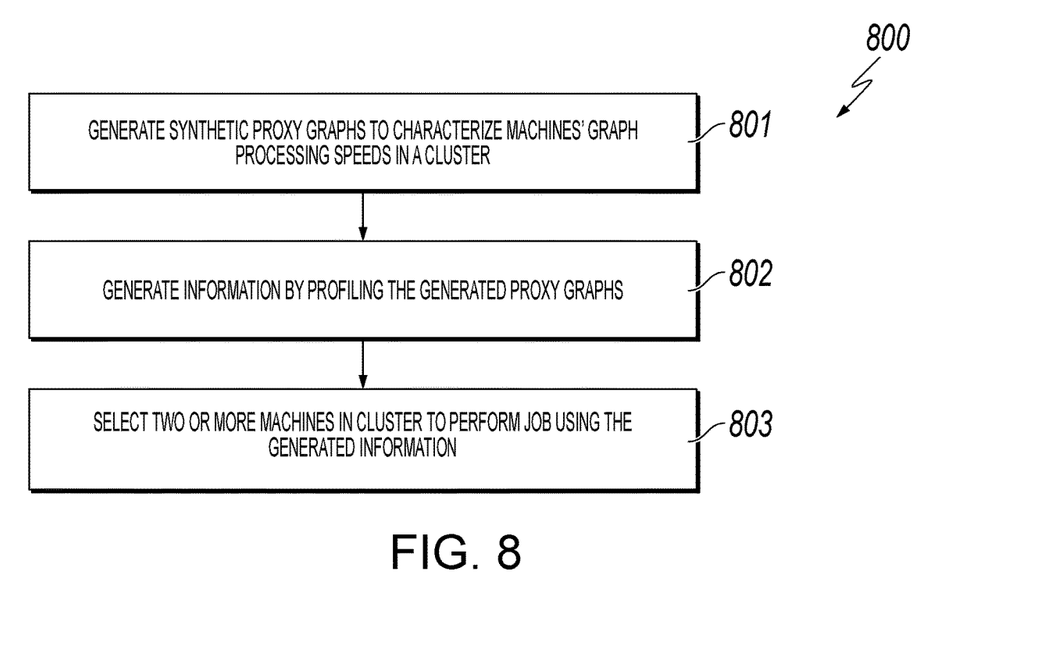
FIG. 8 is a method for selecting which machines in the cluster to perform a job in accordance with an embodiment of the present invention.

Referring now to FIG. 8, FIG. 8 is a method 800 for selecting which machines in the cluster to perform a job in accordance with an embodiment of the present invention.

Referring to FIG. 8, in conjunction with FIGS. 1-5 and 6A-6B, in step 801, computing system 100 generates synthetic proxy graphs to characterize the machines' graph processing speeds in a cluster as discussed above in connection with step 501.

In step 802, computing system 100 generates information (e.g., cost, speedup, performance, energy) by profiling the generated proxy graphs.

In step 803, computing system 100 selects two or more machines in the cluster to perform the job using the generated information.

Figure 9:
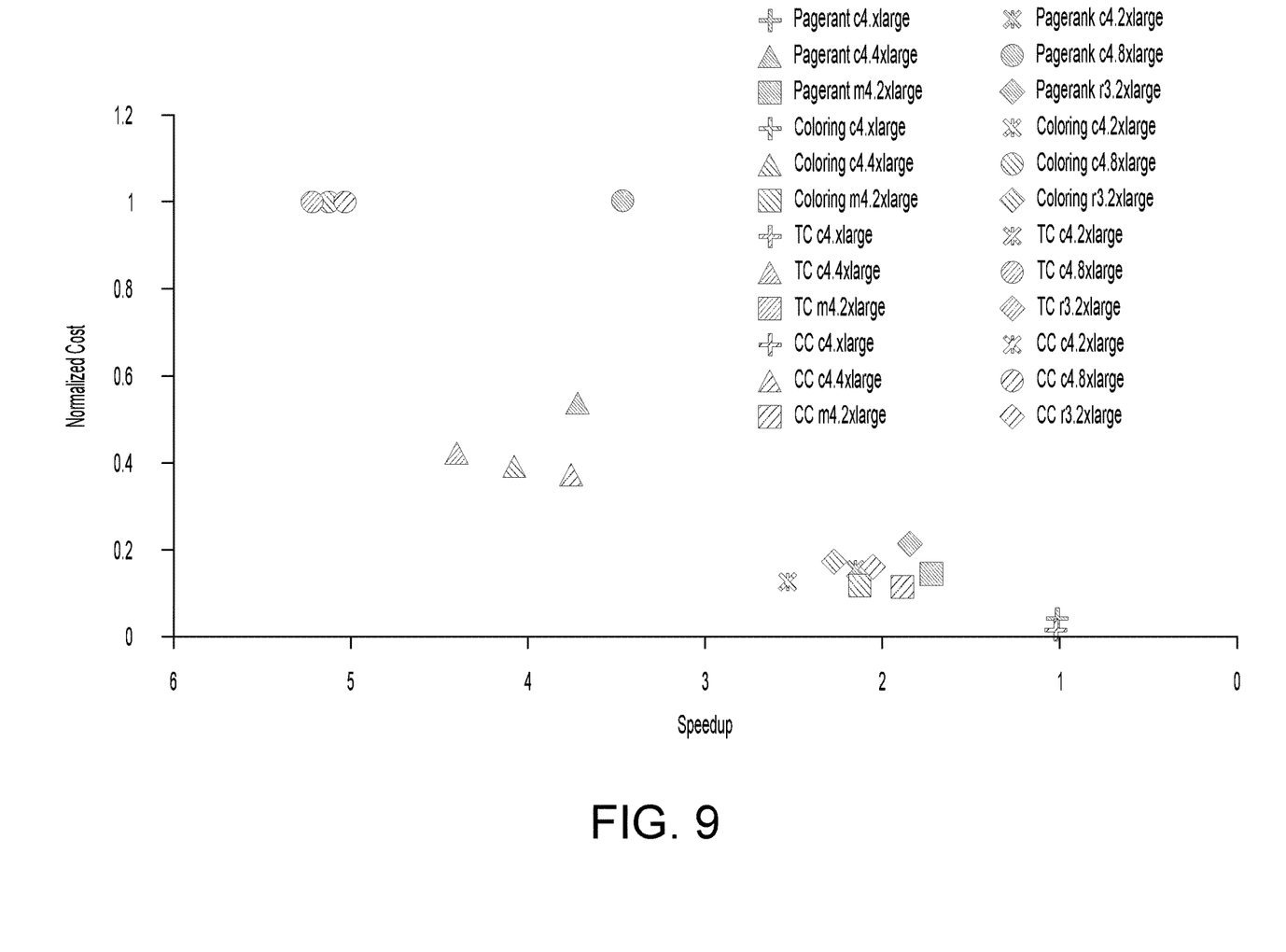
FIG. 9 plots the Pareto space of each individual machine's performance and cost on four applications in accordance with an embodiment of the present invention.

For example, in one embodiment, the present invention projects cost efficiency. For users of cloud computing services, cost is a primary consideration. Other than the performance and energy improvements achieved in a heterogeneous cluster, profiling the synthetic graphs can also offer an accurate overview of the cost efficiency of different machines. FIG. 9 plots the Pareto space of each individual machine's performance and cost on four graph applications (PageRank, Coloring, Triangle Count (TC) and Connected Component (CC)) in accordance with an embodiment of the present invention. All cost and speedup information is generated by profiling synthetic graphs. There are many metrics that can be used to evaluate cost efficiency, such as total cost of ownership (TCO) and cost per throughput/performance. Similarly, the cost per task is used to define a machine's efficiency. The cost per task is defined as the product of task runtimes and a machine's hourly rate. As illustrated in FIG. 9, machines that are of similar type are clustered. All 2×large machines (from three different domains) are grouped together with around 2× around speedup and 0.2× cost, which means that none of them demonstrate their "advertised" specialty for graph applications. Within the computation-optimized domain, one can see that 8×large being the most expensive machine for graph workloads, which is a result of the high charge rate and relatively low performance. The 4×large and 2×large saves 60% and 80% cost and provides 4× and 2× speedup, which should be considered as reasonable candidates for graph applications to satisfy both aspects. Without profiling using synthetic graphs, users would have no insights about the machines provided by cloud services or the machines they may have already deployed. By profiling using synthetic graphs, machines in a cluster can be selected to perform a job using the information generated by profiling the synthetic graphs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for load balancing of graph processing workloads, the method comprising:
   generating synthetic proxy graphs to describe features of machines' graph processing speeds in a cluster;
   profiling each of a plurality of graph applications executing in said cluster using said synthetic proxy graphs to form profiling sets;
   running said formed profiling sets among said machines in said cluster to capture said machines' graph processing speeds;
   computing a relative speedup among said machines in said cluster using a runtime for each group of a plurality of groups of machines in said cluster;
   computing a metric for each of said graph applications from said relative speedup and/or said captured graph processing speeds, wherein said metric represents graph application-specific relations between said captured graph processing speeds of said machines in said cluster;
   loading a graph file of a natural graph and a first graph application of said plurality of graph applications;
   selecting a metric out of said computed metrics based on said first graph application;
   partitioning, by a processor, said natural graph into multiple chunks based on said selected metric; and
   distributing said chunks onto two or more of said machines in said cluster based on said partitioning.

2. The method as recited in claim 1, wherein said metric comprises a parameter corresponding to an execution time of a slowest machine in said cluster.

3. The method as recited in claim 1, wherein each of said generated synthetic proxy graphs is based on a distribution factor that determines a sparsity level of said respective synthetic proxy graph using a number of vertices of said respective synthetic proxy graph.

4. The method as recited in claim 3 further comprising:
   computing a probability density function corresponding to a probability of each vertex existing based on said distribution factor.

5. The method as recited in claim 4 further comprising:
   transforming said probability density function into a cumulative density function, wherein said cumulative density function generates a total number of degrees of any vertex.

6. The method as recited in claim 3 further comprising:
   computing said distribution factor using said number of vertices and edges in said natural graph.

7. The method as recited in claim 1, wherein said synthetic proxy graphs are power-law proxy graphs, wherein said power-law proxy graphs follow a power-law distribution, wherein said power-law distribution is a functional relationship between two objects in statistics, wherein a first object of said two objects varies as a power of a second object of said two objects.

8. The method as recited in claim 1, wherein said cluster is a heterogeneous cluster.

9. The method as recited in claim 1 further comprising:
   classifying said machines of said cluster into different groups;
   selecting one machine from each group to be profiled;
   running each profiling set on one machine from each group to capture each machine's graph processing speed by obtaining a runtime of each group; and
   computing said relative speedup among machines in each group from said runtime.

10. The method as recited in claim 1, wherein said metric represents said graph application-specific relations between graph processing speeds of different types of machines in a heterogeneous cluster.

11. The method as recited in claim 1 further comprising:
storing said computed metrics for said plurality of graph applications.

12. The method as recited in claim 1 further comprising:
finalizing said natural graph by constructing connections among said machines in said cluster; and
executing said first graph application.

13. A method comprising:
generating synthetic proxy graphs to describe features of machines' graph processing speeds of said machines in a heterogeneous cluster, wherein said heterogeneous cluster comprises machines of different processing capabilities;
generating cost and speedup information for each machine by profiling said generated synthetic proxy graphs;
determining a cost efficiency for each of said machines based on said generated respective cost and speedup information;
selecting, by a processor, two or more machines in said heterogeneous cluster having the highest cost efficiency to perform a job; and
executing said job on said selected two or more machines.

14. The method as recited in claim 13, wherein said respective cost efficiency is evaluated using one of the following metrics: a total cost of ownership of said respective machine and a cost per throughput/performance of said respective machine.

15. A computer program product for load balancing of graph processing workloads, the computer program product comprising a non-transitory computer readable storage medium having program code embodied therewith, the program code comprising the programming instructions for:
generating synthetic proxy graphs to describe features of machines' graph processing speeds in a cluster;
profiling each of a plurality of graph applications executing in said cluster using said synthetic proxy graphs to form profiling sets;
running said formed profiling sets among said machines in said cluster to capture said machines' graph processing speeds;
computing a relative speedup among said machines in said cluster using a runtime for each group of a plurality of groups of machines in said cluster;
computing a metric for each of said graph applications from said relative speedup and/or said captured graph processing speeds, wherein said metric represents graph application-specific relations between said captured graph processing speeds of said machines in said cluster;
loading a graph file of a natural graph and a first graph application of said plurality of graph applications;
selecting a metric out of said computed metrics based on said first graph application; and
partitioning said natural graph into multiple chunks based on said selected metric; and
distributing said chunks onto two or more of said machines in said cluster based on said partitioning.

16. The computer program product as recited in claim 15, wherein said metric comprises a parameter corresponding to an execution time of a slowest machine in said cluster.

17. The computer program product as recited in claim 15, wherein each of said generated synthetic proxy graphs is based on a distribution factor that determines a sparsity level of said respective synthetic proxy graph using a number of vertices of said respective synthetic proxy graph.

18. The computer program product as recited in claim 17, wherein the program code further comprises the programming instructions for:
computing a probability density function corresponding to a probability of each vertex existing based on said distribution factor.

19. The computer program product as recited in claim 18, wherein the program code further comprises the programming instructions for:
transforming said probability density function into a cumulative density function, wherein said cumulative density function generates a total number of degrees of any vertex.

20. The computer program product as recited in claim 15, wherein said synthetic proxy graphs are power-law proxy graphs, wherein said power-law proxy graphs follow a power-law distribution, wherein said power-law distribution is a functional relationship between two objects in statistics, wherein a first object of said two objects varies as a power of a second object of said two objects.

* * * * *